(12) United States Patent
De Haan et al.

(10) Patent No.: US 6,385,245 B1
(45) Date of Patent: *May 7, 2002

(54) MOTION ESTIMATION AND MOTION-COMPENSATED INTERPOLITION

(75) Inventors: Gerard De Haan; Robert J. Schutten; Anna Pelagotti, all of Eindhoven (NL)

(73) Assignee: US Philips Corporation, New York, NY (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/156,935

(22) Filed: Sep. 18, 1998

(30) Foreign Application Priority Data

Sep. 23, 1997 (EP) .............................. 97202912

(51) Int. Cl.$^7$ ................................. H04N 7/12
(52) U.S. Cl. ................................. 375/240.16
(58) Field of Search ................ 348/700, 413, 348/414, 415, 416, 417, 699; 375/240.1, 240.16, 240.15; 382/236

(56) References Cited

U.S. PATENT DOCUMENTS

| | | | | |
|---|---|---|---|---|
| 4,862,260 A | * | 8/1989 | Harradine et al. | 348/699 |
| 4,862,264 A | * | 8/1989 | Wells et al. | 375/240.16 |
| 5,093,720 A | * | 3/1992 | Krause et al. | 348/699 |
| 5,371,539 A | * | 12/1994 | Okino et al. | 348/207 |
| 5,818,536 A | * | 10/1998 | Morris et al. | 375/240.15 |
| 5,825,930 A | * | 10/1998 | Park et al. | 382/236 |
| 5,838,391 A | * | 11/1998 | Kim | 348/699 |
| 6,122,317 A | * | 9/2000 | Hanami et al. | 375/240 |
| 6,240,211 B1 | * | 5/2001 | Mancuso et al. | 382/236 |
| 6,269,121 B1 | * | 7/2001 | Kwak | 375/240.16 |
| 6,278,736 B1 | * | 8/2001 | De Haan et al. | 375/240.16 |

OTHER PUBLICATIONS

Proceedings of the SPIE: Image and Video Processing II, vol. 2182, San Jose, Feb. 1994, John Y.A. Wang et al, "Spatio–Temporal Segmentation of Video Data" pp. 120–131.

IEEE Computer Society Conference on Computer Vision and Pattern Recognition, Proceedings, Jun. 1996, Y. Weiss et al, "A Unified Mixture Framework for Motion Segmentation, Incorporating Spatial Coherence and Estimating the Number of Models", ISBN 0–8186–7258–7, pp. 321–326.

"Layered representation for motion analysis" by J.Y.A. Wang and E.H. Adelson, in the Proceedings of the 1993 IEEE Computer Society conference on Computer vision and pattern recognition, pp. 361–366.

"True Motion Estimation with 3–D Recursive Search Block–Matching", IEEE Transactions on Circuits and Systems for Video Technology, vol. 3, Oct. 1993, pp. 368–388.

"Model–based 2D–3D dominant motin estimation for mosaicing video representation," by H.S. Sawhney, S. Ayer, and M. Gorkani, On the net, 1995. A shorter version appeared in the IEEE Intl. Conf. On Computer Vision, Cambridge, MA, USA, Jun. 1995.

* cited by examiner

*Primary Examiner*—Young Lee
*Assistant Examiner*—Allen Wong
(74) *Attorney, Agent, or Firm*—Edward W. Goodman (57) ABSTRACT

In a method of estimating motion, at least two motion parameter sets are generated (PE1-PEn) from input video data (n, n–1), a motion parameter set being a set of parameters describing motion in an image, by means of which motion parameter set motion vectors can be calculated. One motion parameter set indicates a zero velocity for all image parts in an image, and each motion parameter set has corresponding local match errors. Output motion data are determined from the input video data (n, n–1) in dependence on the at least two motion parameter sets, wherein the importance of each motion parameter set in calculating the output motion data depends on the motion parameter sets' local match errors.

16 Claims, 2 Drawing Sheets

MOTION ESTIMATION AND MOTION-COMPENSATED INTERPOLITION

BACKGROUND OF THE INVENTION

1. Field of the Invention

The invention relates to a method and a device for motion estimation, and to a video display apparatus comprising a motion-compensated interpolation device.

2. Description of the Related Art

Motion vectors are used in a range of applications, such as coding, noise reduction, and scan rate conversion. Some of these applications, particularly the frame rate conversion, require the true-motion of objects to be estimated [10,11]. Other applications, e.g., interlaced-to-sequential scan conversion, demand a high accuracy of the motion vectors to achieve a low amplitude of remaining alias [12,13]. Finally, there is a category of applications, e.g., consumer applications of motion estimation, where the cost of the motion estimator is of crucial importance [14,15]. Several algorithms have been proposed to achieve true-motion estimation [3,10,11,15–17]. Algorithms have also been proposed to realize motion estimation at a low complexity level, e.g., [3,14,15,18–20], and in addition to the pel-recursive algorithms that usually allow sub-pixel accuracy, see e.g., [21,22], a number of block-matching algorithms have been reported that yield highly accurate motion vectors [10,23, 24].

Some years ago, a recursive search block-matcher was proposed which combines true-motion estimation as required for frame rate conversion with the low complexity constraint necessary for consumer applications [3]. This design has been commercialized in a Philips IC (MELZONIC, SAA4991) [6,25] which applies motion estimation and compensation techniques to improve the motion portrayal of film material when shown on television, and to eliminate the blurring of image detail in the case of motion as it occurs when displaying sequences at a picture refresh rate differing from the transmission rate. The most challenging task of such processing is the estimation of motion vectors indicating whether, at a given location of the screen, objects are moving or not, and if so, how fast and into which direction. In the known IC, this task is performed by a so-called block-matcher which divides the image into blocks and calculates a motion vector for every block of pixels by minimizing a match criterion. The risk of such processing is that the motion-compensated image, interpolated from neighboring images and using the motion vectors, may show block distortions if the motion vector field suffers from unwanted inhomogeneities. To reduce this risk to an acceptable level, the IC in [6] applies a block-matcher with improved consistency based on spatial and temporal prediction of candidate vectors [3]. An advantageous side effect of this approach to motion estimation is the very significant reduction of processing power required for the function, which is particularly due to the very limited candidate vector count.

The article "Layered representation for motion analysis" by J. Y. A. Wang and E. H. Adelson, in the Proceedings of the 1993 IEEE Computer Society conference on Computer vision and pattern recognition, pp. 361–366, [29] discloses a set of techniques for segmenting images into coherently moving regions, using affine motion analysis and clustering techniques. An image is decomposed into a set of layers along with information about occlusion and depth ordering. A scene is analyzed into four layers, and then a sequence is represented with a single image of each layer, along with associated motion parameters.

SUMMARY OF THE INVENTION

It is, inter alia, an object of the invention to provide a motion estimator having a further reduced complexity. To this end, a first aspect of the invention provides a method and a device for estimating motion in video data. A second aspect of the invention provides a method and a device for motion-compensating video. A third aspect of the invention provides a video display apparatus including said device for motion-compensating video data.

In a method of estimating motion in accordance with a primary aspect of the present invention, at least two motion parameter sets are generated from input video data, a motion parameter set being a set of parameters describing motion in an image, by means of the motion parameter set, motion vectors can be calculated. One motion parameter set indicates a zero velocity for all image parts in an image, and each motion parameter set has corresponding local match errors, such as, match errors determined per block of pixels. Output motion data are determined from the input video data in dependence on the at least two motion parameter sets, wherein the importance of each motion parameter set (determined by weighting factors W, see equations 17, 18 and between equations 20, 21) in calculating the output motion data depends on the motion parameter sets' local match errors. Local match errors are to be understood in contrast with global match errors, such as, match errors calculated for the entire image.

In a method of motion-compensating video data in accordance with another aspect of the present invention, at least two motion parameter sets are generated from input video data, one motion parameter set indicating a zero velocity, and each motion parameter set having corresponding match errors, and output video data are interpolated from the input video data in dependence on the at least two motion parameter sets, wherein the importance of each motion parameter set in calculating the output video data depends on the motion parameter sets' match errors.

In one embodiment, the reduction is so significant that the processing can run on a fully programmable device, more particularly, the Philips TriMedia processor.

These and other aspects of the invention will be apparent from and elucidated with reference to the embodiments described hereinafter.

DESCRIPTION OF THE PREFERRED EMBODIMENTS

In [5], a method was disclosed how to estimate global motion from an image sequence. It is assumed that motion in the image can be described with a two-dimensional first order linear equation, using $\vec{D}(\vec{x}, n)$ for the displacement vector at location $\vec{x}$ in the image with index n:

$$\vec{D}(\vec{x}, n) = \begin{pmatrix} p_1(n) + p_3(n)x \\ p_2(n) + p_3(n)y \end{pmatrix} \quad (1)$$

It is recognized here that if we only aim at estimating global motion vectors, the input to the parameter calculation means can be simpler than what has been described in [5].

With only such global motion vectors available, the up-conversion problem becomes the most challenging part of the processing. [1,4] described a method for robust motion-compensated temporal interpolation of image data. The basic idea consisted of a three-tap median filter which produces an output pixel selected to be either the motion compensated pixel mcl(eft) from the previous field n−1, the motion-compensated pixel mcr(ight) from the next field n, or the non-motion-compensated average av from both neighboring fields n−1, n:

$$F_i(\vec{x}, n-\tfrac{1}{2}) = \mathrm{med}(\mathrm{mcl}, \mathrm{av}, \mathrm{mcr}) \quad (2)$$

with $$\mathrm{mcl} = F(\vec{x} - \alpha\vec{D}(\vec{x}, n), n-1) \quad (3)$$

$$\mathrm{av} = \tfrac{1}{2}(F(\vec{x}, n) + F(\vec{x}, n-1)) \quad (4)$$

$$\mathrm{mcr} = F(\vec{x} + (1-\alpha)\vec{D}(\vec{x}, n), n) \quad (5)$$

$$\mathrm{med}(a, b, c) = \begin{cases} a, & (b \le a \le c \lor c \le a \le b) \\ b, & (a \le b \le c \lor c \le b \le a) \\ c, & (\text{otherwise}) \end{cases} \quad (6)$$

Figure 1:
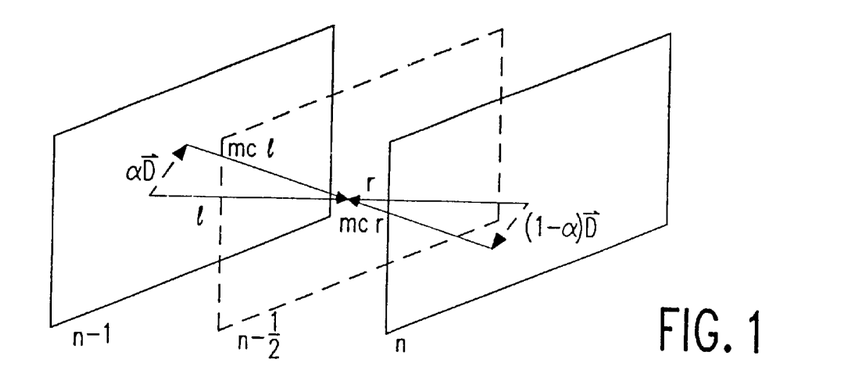
FIG. 1 illustrates two possibilities for motion compensation in accordance with the present invention.

The pixels used in the motion compensation are schematically drawn in FIG. 1. Although quite robust, an even more robust algorithm could be considered for our new very limited motion estimator proposal, including a three-tap median filter which produces an output pixel selecting either the corresponding pixel l(eft) in the previous field n−1, the corresponding pixel r(ight) in the next field n, or the motion compensated average mcav from both neighboring fields n−1, n:

$$F_i(\vec{x}, n-\tfrac{1}{2}) = \mathrm{med}(l, \mathrm{mcav}, r) \quad (7)$$

with:

$$l = F(\vec{x}, n-1) \quad (8)$$

$$\mathrm{mcav} = \tfrac{1}{2}(F(\vec{x} - \alpha\vec{D}(\vec{x}, n), n-1) + F(\vec{x} + (1-\alpha)\vec{D}(\vec{x}, n), n)) \quad (9)$$

$$r = F(\vec{x}, n) \quad (10)$$

However, this up-converter, which is indeed very robust, limits the advantage of motion compensation severely (the motion compensation is limited to the lower frequencies only). Therefore, in accordance with a preferred embodiment, the up-converter is adapted between the first and the second option, depending on the expected quality of the motion vectors. A favorable feature of the proposed interpolators is that switching between the two robust options is not very critical. This implies that a fairly rough decision is acceptable, which can be realized with little processing power on a (spatially) reduced size version of the input sequence. This reduced size input sequence is used to calculate match errors obtained with (at least) two motion vectors per location, either generated from a parameter model or the zero vector.

The result is a segmentation which divides the image into layers where the zero vector model or the calculated parameter model is more appropriate. The segmentation mask SM is now used as an extra input of the up-converter UC, which uses the mask SM to switch/fade between both previously described up-converters (see FIG. 2). In the case of a valid parameter model, the up-converter tends towards the interpolation of equation 2, otherwise towards the interpolation of equation 7.

Figure 2:
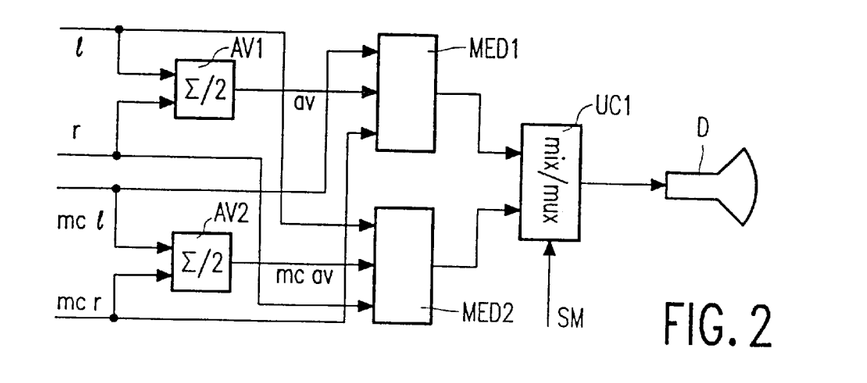
FIG. 2 shows a first embodiment of a motion-compensated interpolator in accordance with the present invention.

In FIG. 2, the values l and r (see FIG. 1) are applied to a first averager AV1 to produce the value av. A first median filter MED1 determines the median of the values av, mcl, and mcr. The values mcl and mcr are applied to a second averager AV2 to produce the value mcav. A second median filter MED2 determines the median of the values mcav, l, and r. The up-converter UC1 furnishes the interpolated value from the output signals of the median filters MED1, MED2 in dependence upon the segmentation mask SM. The output signal of the up-converter UC1 is applied to a display unit (D) for displaying the output video data (n−½) between the input video data (n, n−1).

Figure 3:
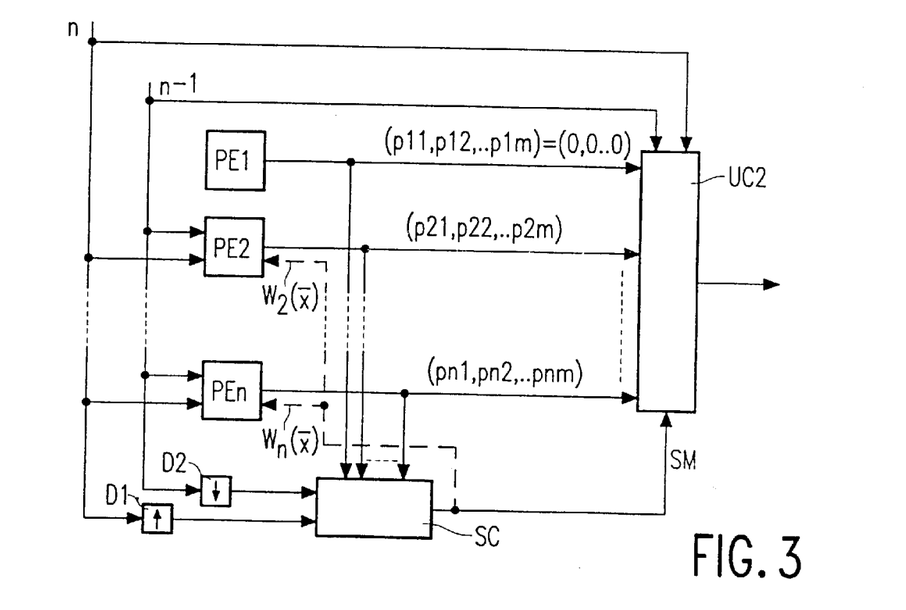
FIG. 3 shows a second embodiment of a motion-compensated interpolator in accordance with the present invention.

From this point, extensions towards multiple layers can be considered, in which several parameter estimators PE1 . . . PEn (see FIG. 3, showing a layered parameter-based estimator and up-converter) run parallel, each generating parameters models for different, not necessarily fixed, parts of the image. These parameter estimators PEi are again the input of a segmentation circuit SC which finds the parts of the image for which each model is valid, or in other words, determines a segmentation mask SM indicating the best interpolation method (parameter set) for each part of the image. The up-converter UC2 should again choose the best possible interpolation method for each separate layer within the image in dependence upon the segmentation mask SM.

In FIG. 3, current image data from the input field n and previous image data from the input field n−1 are applied to the parameter estimators PE2 . . . PEn to determine motion parameters p21-p2m . . . pn1-pnm. A first parameter estimator PE1 just furnishes zero parameters. The input fields n and n−1 are also applied to the segmentation circuit SC via down-samplers D1, D2. The up-converter UC2 calculates motion vectors in the manner indicated by equation 1 from the parameter set indicated by the segmentation mask SM, to interpolate the output field n−½ from the input fields n and n−1. The weighting factors W are explained below with reference to equations 17 and 18, and between equations 20 and 21. Each parameter estimator PE2 . . . PEn comprises an error calculation to adjust the motion parameters. This calculation is preferably limited to those image parts which correspond to the parameter set delat with by the subject parameter estimator PE. To this end, a weight W is assigned which fits with the amount of correspondence (kind of fuzzy logic). In the end, at the interpolation, for each pixel, that parameter set is used that yields the lowest estimation error for each pixel.

In the following part of this disclosure, preferred parameter estimators will be discussed.

In [2], methods of estimating global motion parameters from an image sequence are described. The book focuses on various options for solving the multi-dimensional optimization problem, such as gradient-based methods, simulated annealing, etc. In accordance with a further aspect of the present invention, these motion parameters are estimated with a significantly reduced operations count to either reduce the cost of dedicated silicon, or even enable processing on a programmable architecture (particularly, the Philips TriMedia processor).

In [5], a method was disclosed to estimate global motion parameters from an image sequence. It is assumed that motion in the image can be described with a two-dimensional first-order linear equation. More complex parametric motion models have been proposed [2] and can indeed be applied in combination with the present invention, but will not be discussed in this disclosure. In [5], the parameter model was used to generate attractive candidate vectors for a block-based motion estimator. The input to the parameter estimator was the previous output vector field obtained from this block-based estimator. It is recognized here that if we aim at only estimating global motion vectors, the input to the parameter calculation means can be simpler.

Limiting ourselves, for clarity, to the four parameter model of equation 1, we first define the parameter vector $\vec{P}$:

$$\vec{P}(n) = \begin{pmatrix} p_1(n) \\ p_2(n) \\ p_3(n) \\ p_4(n) \end{pmatrix} \quad (11)$$

and define our task as selecting $\vec{P}(n)$ from a number of candidate parameter vectors $\vec{C}_p(n)$ as the one that has the minimal value of a match criterion calculated in accordance with:

$$\epsilon(\vec{C}_n, n) = \sum_{x} |F(\vec{x}, n) - F(\vec{x} - \vec{D}(\vec{x}, n), n-1)| \quad (12)$$

The calculation of this error function can be greatly simplified by applying a strong subsampling. Experiments indicate that good results can be achieved with a match criterion calculated on just some 300 pixels per field, i.e., a subsampling factor of the order of 1000! The most effective by far, however, is a clustered subsampling, i.e., the selected pixels form groups sparsely distributed over the field.

The proposal to perform the minimization involves taking a prediction vector (now at least 3-dimensional, in our example 4-dimensional), adding at least one update vector, and selecting the best in accordance with equation 13. Good results could be experimentally obtained when generating a candidate vector set $CS_p(n)$ containing three candidate parameter vectors $\vec{C}_p(n)$ in accordance with:

$$CS_p(n) = \{\vec{C}_p(n) | \vec{C}_p(n) = \vec{P}(n-1) + m\vec{U}_p(n), \vec{U}_p(n) \in US_p(n), m = -1, 0, 1\} \quad (13)$$

with $US_p(n)$ selected in accordance with:

$$US_p(n) = \left\{ \begin{pmatrix} i \\ 0 \\ 0 \\ 0 \end{pmatrix}, \begin{pmatrix} 0 \\ i \\ 0 \\ 0 \end{pmatrix}, \begin{pmatrix} 0 \\ 0 \\ i \\ 0 \end{pmatrix}, \begin{pmatrix} 0 \\ 0 \\ 0 \\ i \end{pmatrix} \right\}, \quad (i = 1, 2, 4, 8, 16) \quad (14)$$

Penalties can be added to the match error of individual candidate vectors (parameters sets) to obtain e.g., temporal smoothness. Also temporal filtering of the parameter vectors, either within or outside the prediction loop, is considered to prevent a sudden change of motion vectors from one image to the other.

Although it has been suggested in the description so far that the parametric motion model describes the global motion of the entire image, alternatives can be thought of, in which the image is divided into some, e.g. 9, large blocks, and possible predictions are not only the temporal prediction, but also one or more spatial predictions. A further alternative includes segmentation, and a fixed number of parameter estimators run in parallel, each focusing on a segment of the image indicated by the segmentation algorithm run on a previous image.

The operations count is incredibly low. Calculation of the error criterion amounts to approximately 1000 operations per candidate vector per iteration. For the described implementation, this results in $$\frac{3 \cdot 16 \cdot 1000}{720 \cdot 288} \approx \frac{48}{207} \approx 0.23$$

operations per pixel. This is a reduction by another one or two orders of magnitude as compared with the estimator of [6].

Figure 4:
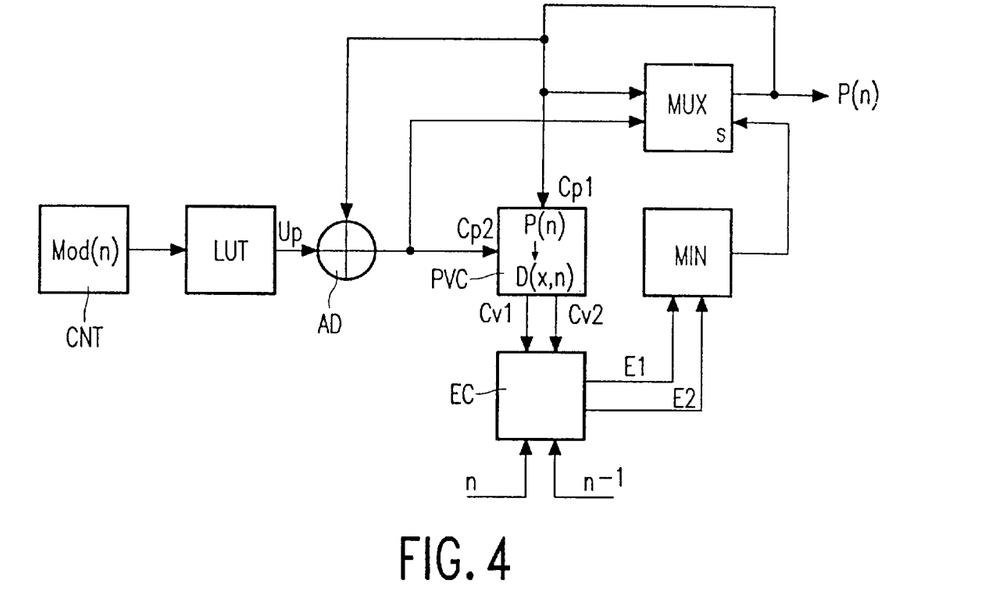
FIG. 4 shows a block diagram of a motion parameter estimator in accordance with the current invention.

FIG. 4 shows a block diagram of a motion parameter estimator according o the current invention. First and second candidate parameter sets Cp1, Cp2 are applied to a multiplexer MUX and to a parameter-to-vector converter PVC to obtain two candidate motion vectors Cv1, Cv2. The first candidate parameter set Cp1 is the previous output parameter set P(n) of the multiplexer MUX. The second candidate parameter set Cp2 is obtained by adding (adder AD) an update parameter set Up to the first candidate parameter set Cp1. The update parameter set Up is obtained by applying the result of a mod(n) counter CNT to a look-up table LUT. The candidate motion vectors Cv1, Cv2 are applied to an error calculator EC, to which the present and previous fields n, n−1 are also applied, to obtain two errors E1, E2. A minimum circuit MIN determines which error is the smaller, to obtain a selection signal s for the multiplexer MUX in order to obtain the output parameter set P(n).

The following part of this disclosure describes a preferred method of estimating motion parameters from video data. Motion estimation is applied in coding and scan rate conversion of video data. Although usually the picture rate of this video data at the input of the motion estimator is fixed, the picture rate of the video source from which this data originated may differ from that of the processed data. Particularly, this occurs when film material is converted to video, or when video material from one video standard is converted to another standard somewhere in the video chain prior to the motion estimator.

A common way of dealing with the required picture rate conversions is to use the most recent picture until a new one becomes available. When converting from a low picture rate to a higher one, this implies repetition of source pictures in the new format, while a conversion from a high to a lower rate leads to occasionally skipping images of the source material. In either case, the resulting video exhibits an irregular motion pattern (shudder), which violates the common assumption in motion estimators that motion has a strong temporal consistency. In motion estimators that try to profit from this assumption, by using temporal prediction vectors, the problem results that the irregular motion behavior eliminates the usefulness of these temporal prediction vectors. A serious degradation of the estimated motion vectors may result.

In [9], a solution for this problem was disclosed, for movie material transmitted in a 50 Hz television standard.

The idea here is to recirculate the vector prediction memory when a repeated picture occurs. In [8], a method was disclosed in which the picture memory storing the 'previous' picture was recirculated until a non-repeated picture occurred. A characteristic shared by both prior art methods is that the pattern has to be known in order to change the memory control.

It is an object of the current aspect of the invention to provide a very robust motion estimation method that needs no a priori knowledge of the repetition pattern to reliably estimate motion. To this end, the motion estimator takes temporal prediction vectors from more than one previous image pair (as much as the maximum length of the repetition pattern), and selects the best of these as a basis for the estimation process, or uses all of them as candidates in a matching process.

This solution is economically justifiable, particularly in object-based motion estimators, where the number of motion vectors to be stored is very small. A software version of the algorithm has been shown to run real-time on the Philips TM1000 (TriMedia) processor.

Figure 5:
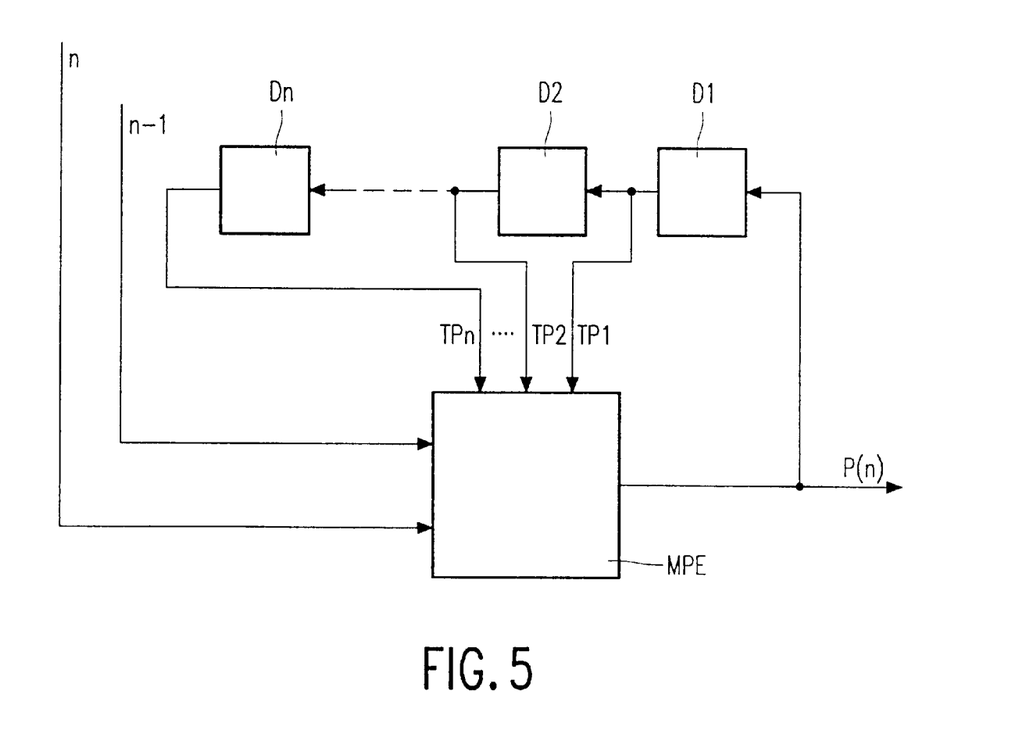
FIG. 5 illustrates a preferred parameter estimator in accordance with the present invention.

FIG. 5 illustrates a preferred parameter estimator in accordance with the present invention. Current image data from the present field n and previous image data from the previous field n−1 are applied to a motion parameter estimator unit MPE to obtain motion parameters P(n). Picture delays D1, D2, . . . Dn furnish delayed versions TP1, TP2, . . . TPn of the motion parameters P(n) to the motion parameter estimator unit MPE.

The following part of this disclosure relates to a layered motion estimation, i.e. the image is segmented into a plurality of layers.

Region-based motion estimators have been introduced as an alternative to block-based motion estimators. Block-based motion compensation has been adopted in the international standards for video compression, such as H.261/263 (video-conferencing over ISDN lines), MPEG-1 (multimedia) and MPEG-2 (all-digital TV application). Although these standards do not specify a particular motion estimation method, block-based motion estimation becomes a natural choice.

However, the use of blocks as units for motion estimation may result in blocking artifacts, because the boundaries of objects do not generally correspond to block boundaries, and adjacent blocks may be assigned substantially different motion vectors if no spatio-temporal consistency constraint is present.

A promising approach to solve the problem of block artifacts and to provide more accurate prediction along moving edges is to segment the motion field. Motion information and pattern information (intensity, contour texture) are used in order to achieve a region-based (arbitrarily shaped) motion estimation, the next goal being objects handling and possibly MPEG-4' Audio-Visual (AV) objects'.

Several methods have been proposed [2] to segment images and estimate motion parameters for these segments from an image sequence. Depending on their strategy in carrying out the segmentation, these methods can be classified into Bottom-up methods, Top-down methods, and Layered representation. We shall briefly summarize the characteristics of the individual categories.

Bottom-up Methods

The processing starts with an intra-frame segmentation of the image based on pattern information, or on a previously calculated dense motion vector field. The segmentation generally results in a number of small regions. Those regions are then merged, generally using information on their motion, i.e., regions with similar motion are merged into one region, and motion parameters are then re-calculated. This procedure proves to be fairly popular when the aim is object-oriented coding. Examples in [26–29].

Top-down Methods

The processing starts with an initial image segmentation in large regions. These are subdivided where the calculated motion model lacks accuracy, and motion parameters are re-calculated. The initial segmentation is generally based on a changed/unchanged rule, i.e., the current image is compared with the previous one: when, in the same position, the luminance value in one frame is considerably different from the one in the other one, this pixel is marked as 'changed', or 'unchanged' otherwise. Subsequently, the part of the image classified as 'changed' can be motion-compensated, in accordance with the motion field calculated for that region, and the previously described procedure is iterated in order to identify the different motion regions. Examples in [11,30,31,36].

The two techniques can also be combined, e.g., the initial segmentation starts can be random, or based on a previous estimation [11,32], and successive refinements are in both directions. The estimation and the segmentation can also be performed simultaneously, using a statistical approach to the analysis of image sequences, e.g., with a Maximum Likelihood Estimation method [33].

Layered Representation Methods

The ideal scene segmentation results in separate objects, and involves 3-D information, but this is difficult to obtain and computationally intensive. Therefore, the video data is segmented and described as a set of moving layers, i.e., of image parts, undergoing similar motion, even if disconnected. Then order (depth) of the layers is determined. Examples in [29,34,35]. A model which is less complicated than the full 3-D model and less complicated than a model that deals with all objects in the sequence has been proposed. Since it is the model adopted in a preferred embodiment, it will be described in more details in the following paragraphs.

In accordance with these layered representation methods, the video data is segmented and described as a set of moving layers, i.e., of regions undergoing similar motion, even if disconnected. The depth order of the layers can then be determined. A layered representation of a video sequence is interesting for several applications such as scan rate conversion, object tracking, video compression, coding, video annotation and indexing. A number of algorithms have already been presented for layered motion estimation [29, 34–37].

One of the crucial points in these algorithms is the way the motion estimation/segmentation problem is solved. Two main approaches have been proposed.

Sequential Approach

The sequential approach resolves multiple layers by estimating sequentially a dominant motion, similarly to what is done in the top-down method. The main drawback of such an approach is that, since the final segmentation is not yet known while dealing with one layer, part of the image with a different motion can be included in the estimation of the motion parameters, affecting the results.

Simultaneous Approach

The simultaneous approach attempts to estimate, simultaneously, all the layers in the image. This can be done by using a pre-computed dense motion vector field. The initial set of motion models can be derived by using a clustering algorithm on the given motion vector field [29]. In computing the motion vector field, some smoothness assumptions are generally made. This may lead to a motion vector field in which the boundaries do not correspond to objects/layers boundaries, so that a correct segmentation is not possible. Alternatively, the problem can be formulated as a stochastic problem, and a Maximum-Likelihood Estimation of the multiple models, and their layers of support, can be performed using an Expectation-Maximisation algorithm [36]. The main drawback of the two last-mentioned methods is their complexity.

Another crucial point is the way the motion parameters are estimated. Depending on whether the estimation of motion parameters is carried out on the luminance signal itself or not, it can be classified as direct or indirect. The direct methods are generally considered to be more robust. In [2], several methods of estimating global motion parameters from an image sequence are described. Various options for solving the multi-dimensional optimization problem, such as gradient-based methods, simulated annealing, etc., have been proposed. It is the purpose of the proposed algorithm to estimate these motion parameters with a significantly reduced operations count to enable motion estimation on a programmable architecture.

It is the topic of the current part of this disclosure to estimate/segment image sequences with a significantly reduced operations count to either reduce the cost of dedicated silicon or even enable processing on a programmable architecture (particularly, the Philips TriMedia processor).

The current aspect of the invention deals with motion estimation/segmentation aiming at a layered representation. To keep the cost of the implementation as low as possible, we focus on an implementation as a direct method, although an indirect version seems feasible. It provides an elegant solution to the chicken and egg problem of combined motion estimation/segmentation. The solution consists of a weighting process that limits the pollution of the optimization criterion of a parameter estimator for a given layer by information dealt with by the other parameter estimators running in parallel. Designing a motion estimator to run real-time on existing programmable architectures, imposes severe constraints on the problem of motion estimation, since the complexity of the algorithm has to be drastically reduced. A layered motion estimator has been chosen for this purpose, since it is believed that it is potentially easier to implement on a programmable architecture than e.g., a block-based motion estimation, seeing that there are fewer layers than blocks.

In a layered representation, an image is divided into a number of layers, i.e., parts of the image undergoing a coherent motion, even if disconnected. We assume that the apparent motion (optical flow) in a sequence can then be described with parametric models, i.e., it is only due to a combination of camera motions and rigid motion of opaque objects. Hence, one set of motion parameters can be estimated for each layer instead of the motion field itself.

Segmenting a sequence of images in regions undergoing similar motions and simultaneously estimating their motion is, in itself, an ill-posed problem, since the two assignments are inter-dependent. In order to correctly estimate the motion in one region, the region should be known. However, in order to determine the regions of the image that move coherently, their motion should be known. A new method for a quasi-simultaneous motion estimation and segmentation up to a fixed number of layers is presented. We address the problem of estimating the motion parameters for each layer and simultaneously segment the image introducing a hierarchy, i.e., giving a different rank to the layers. The two goals this hierarchy is meant for are:

To prevent a certain layer from estimating on parts of the image that are well covered by layers ranked higher in the hierarchy.

To prevent a certain layer from being polluted by parts of the image that will be better covered by layers ranked lower in the hierarchy.

The parameter vectors are then estimated in parallel, using a recursive approach, i.e., the earlier estimated parameter vector for each layer is used as a prediction to which update vectors are added. The selected parameter vector is the one resulting in the lowest match error. After this, the parameter vectors of all layers together are used in the segmentation of the image into the desired different layers.

The motion of each layer 1 is described by a simple motion model. It is assumed that the motion within a layer can be described with a two-dimensional first order linear model.

$$\vec{D}(\vec{x}, l, n) = \begin{pmatrix} s_x(l, n) + d_x(l, n) \cdot x \\ s_y(l, n) + d_y(l, n) \cdot y \end{pmatrix} \quad (15)$$

using $\vec{D}(\vec{x}, l, n)$ for the displacement vector of layer 1 at location $\vec{x} = (x,y)^T$ in the image with index n. With this four-parameter model, horizontal and vertical translations (pan and tilt) as well as zoom can be described. More complex parametric motion models have been proposed [2] and can indeed be applied in combination with the proposed algorithm, but will not be discussed hereinafter. In the experiments, this motion model has been used with several degrees of freedom:

All four parameters free.

The parameters $s_x$ and $s_y$ free, $d_x$ and $d_y$ coupled with a fixed ratio in accordance with the aspect ratio of the image (three-parameter model).

The parameters $s_x$ and $s_y$ free, $d_x$ and $d_y$ fixed to zero (two-parameter, translation model).

The parameter $s_x$ free, $x_y$, $d_x$ and $d_y$ fixed to zero (one-parameter, panning model).

In one embodiment, a first layer has 4 or 8 free parameters, while each subsequent layer has less free parameters than the preceding layer to reduce the computational burden.

The invention is based on the recognition that the zero vector (no motion) is very common and important in video sequences, and especially important for the intended application in scan rate conversion. Therefore, the proposed algorithm starts with a layer 0, with motion described by the zero parameter vector (which is obviously not estimated). The parameter vectors of additional layers 1, 1>0, are estimated separately by their respective parameter estimators $PE_l$.

Each $PE_l$ has the same basic principle as the 3D recursive search block matcher of [3]. A previously estimated parameter vector is updated in accordance with a pseudo-random noise vector, after which the best matching parameter vector is chosen.

Considering the parameter model of equation (15), the parameters of layer 1, 1>0, are regarded as a parameter vector $\vec{P}_l$:

$$\vec{P}_l(n) = \begin{pmatrix} s_x(l, n) \\ s_y(l, n) \\ d_x(l, n) \\ d_y(l, n) \end{pmatrix} \quad (16)$$

and we define our task as to select $\vec{P}_l(n)$ from a number of candidate parameter vectors $\vec{CP}_l(n)$ as the one that has the minimal value of a match criterion. The error function is calculated in accordance with:

$$\epsilon'(\vec{CP}_l(n)) = \epsilon(\vec{CP}_l(n)) + \sum_{\vec{x} \in X_l} W_l(\vec{x}) \cdot II(\vec{CP}_l(n)) \quad (17)$$

where penalties $II(\vec{CP}_l(n))$ are added to the match error of individual candidate vectors (parameters sets) to obtain, e.g., spatial smoothness, and $\in$ is:

$$\epsilon(\vec{CP}_l(n)) = \sum_{\vec{x} \in X_l} = W_l(\vec{x}) \cdot |F_s(\vec{x}, n) - F_s(\vec{x} - \vec{D}(\vec{x}, l, n), n-1)| \quad (18)$$

where $W_l(\vec{x})$ is a weighting factor that depends on the position $\vec{x}$, $F_s(\vec{x}, n)$ is the luminance value at position $\vec{x}$ in the sub-sampled image with index n, and $X_l$ is a set of positions $\vec{x}$ where the motion of layer 1 is to be estimated (the mode of selecting of positions $\vec{x}$ will be explained below).

The images are sub-sampled with a factor of 4 horizontally and 2 vertically on a field base, generating a sub-sampled image $F_s(n)$ from each original field F(n). This contributes strongly to the desired reduction of operations count. The sub-sampling is permitted because the objects for which motion is estimated are large enough. In order to achieve pixel or even sub-pixel accuracy on the original pixel grid of F, interpolation is required on the subsampling grid [7].

The proposed minimization shows some analogy with the strategy exploited in [3,7], i.e., take a prediction vector (in this case four-dimensional), add at least one update vector, and select the best candidate vector in accordance with equation (18). Good results could experimentally be obtained when generating a candidate parameter set $S_{\vec{CP}l}(n)$, containing three candidates $\vec{CP}_l(n)$ in accordance with:

$$S_{\vec{CP}_l}(n) = \{\vec{CP}_l(n) | \vec{CP}_l(n) = \vec{P}_l(n-1) + m\vec{UP}_l(n), \vec{UP}_l(n) \in S_{\vec{UP}_l}(n), m = -1, 0, 1\} \quad (19)$$

with update parameter $\vec{UP}_l(n)$ selected from update parameter set $S\vec{UP}_l(n)$:

$$S_{\vec{UP}_l}(n) = \left\{ \begin{pmatrix} i \\ 0 \\ 0 \\ 0 \end{pmatrix}, \begin{pmatrix} 0 \\ i \\ 0 \\ 0 \end{pmatrix}, \begin{pmatrix} 0 \\ 0 \\ i \\ 0 \end{pmatrix}, \begin{pmatrix} 0 \\ 0 \\ 0 \\ i \end{pmatrix} \right\}, \quad (20)$$

Temporal filtering of the parameter vectors, both within and outside the prediction loop, is applied to prevent a sudden change of motion vectors from one image to the other.

The algorithm described so far performs one iteration on a pair of input images. Faster convergence of the algorithm is achieved with multiple iterations of the parameter estimators on the same pair of input images, in this case $\vec{P}_l(n-1)$ in equation (19) is replaced with the output of the previous iteration $\vec{P}_l(n)$ after the initial iteration on a pair of images.

A hierarchical structure of the layers is proposed. This is achieved by:

Selection of positions $\vec{x}$ in $X_l$ excluding image parts well covered by higher ranked layers.

Within $X_l$, reducing the effect of image parts that are potentially better covered by layers ranked lower in the hierarchy: assignment of higher weights $W_l(\vec{x})$ to the pixels assigned to layer 1 in the previous segmentation.

Each estimator, apart from the highest in the hierarchy (the zero estimator), minimizes a match error calculated in regions in which all higher level estimators where unsuccessful in the previous image. The set of positions $X_l$ is filled with the positions $\vec{x}$ where the match error of all higher ranked layers exceeds the average block match error with a fixed factor.

Experiments indicate that good results are still achieved when the number of positions in $X_l$ is limited to just some 2–5% of all pixels in the image. The most effective is a clustered sub-sampling within the image, i.e., the selected pixels form groups sparsely distributed over the entire image. In the current application, a maximum of 50 clusters of 16 pixels is chosen (3% of all pixels in $F_s$).

A correct selection of $X_l$ is necessary to prevent the current estimator from estimating motion that is already covered by previous layers.

The location-dependent weighting factor $W_l(\vec{x})$ is determined by the segmentation mask SM(n-1) found in the previous image. Positions $\vec{x}$ that belong to the current layer 1 in accordance with the segmentation mask will have a weighting factor greater than one, where positions belonging to a different layer have a weighting factor of one. A correct selection of $W_l(\vec{x})$ is necessary to prevent the current estimator from estimating motion that can be covered by subsequent layers in the hierarchy.

The segmentation step is the most critical step in the algorithm. Its task is to assign one of the layers, i.e., one model of motion, in the image to each group of pixels. This is basically achieved by assigning the best matching model to each group of pixels (a block $\vec{B}$, which is typically as large as 8×8 pixels on frame base).

For each layer, a match error is calculated in accordance with:

$$\epsilon(\vec{B}, l, n) \\ \sum_{\vec{x} \in \vec{B}} = |F_s(\vec{x} + (1-\alpha)\vec{D}(\vec{x}, l, n), n) - F_s(\vec{x} - \alpha\vec{D}(\vec{x}, l, n), n-1)| \quad (21)$$

Segmentation mask $SM(\vec{B}, n)$ assigns the layer 1 with the lowest $\in$ to the block $\vec{B}$. The temporal position of the segmentation is defined by $\alpha$, which was set to ½ in our experiments.

In order to save processing power, the segmentation mask SM does not have to be calculated for every block $\vec{B}$. Instead, the calculated blocks can be sub-sampled in a quincunx pattern, after which the missing positions in the segmentation mask are interpolated (e.g., by choosing the most occurring layer number from a neighborhood) [7].

Segmentation is more difficult as more layers are present, since the segmentation task will resemble more and more that of a full search block matcher. To prevent an output of the motion estimator that has inconsistencies similar to those of a full search block matcher, extra (smoothing) constraints have been added to the algorithm. Current smoothing constraints consist of:

Spatial smoothing: by taking a larger window in the calculation of the $\in$ than the size of the block $\vec{B}$ to which the layer is assigned.

Temporal smoothing: by reducing the calculated $\in$ of a layer with a bonus value if this layer was chosen in the segmentation of the previous image.

Spatial smoothing: by using a majority filter to remove singular spots in the segmentation.

As a result of experiments, a three-layered structure was chosen in the first implementation on TriMedia. Layer 0 is not estimated, corresponding to no-motion, i.e., all parameters equal to 0. Layer 1 has two free parameters and layer 2 has just one free parameter. The parameter estimator of layer 1 iterates 5 times, and the estimator of layer 2 iterates 3 times, on each input image pair.

A simple pre-filtering of the sub-sampling is achieved by averaging pixel values in a block of 4×2 pixels. This takes approximately 10 operations per sub-sampled output pixel, or $$\frac{180 \cdot 144 \cdot 10}{720 \cdot 288} \approx 1.25$$

operations per pixel of the input grid (CCIR 601/625 lines/ 2:1).

Calculation of the error criterion in a parameter estimator takes approximately 1000 operations per candidate vector per iteration. For the described implementation, this results in $$\frac{3 \cdot (5+3) \cdot 1000}{720 \cdot 288} \approx 0.12$$

operations per pixel (this does not cover all functions of the parameter estimation). The calculation of the error criterion in the segmentation takes approximately 10 operations per layer per block, so $$\frac{3 \cdot (72 \cdot 90/2) \cdot 10}{720 \cdot 288} \approx 0.47$$

operations per pixel (this does not cover all functions of the segmentation). This is a reduction of another order of magnitude as compared with the estimator of MELZONIC (SAA4991) [3]. Measurements in partially optimized code for TriMedia indicate an achieved operation count of about 1.25 for the sub-sampling, 1.0 for the parameter estimator and 6.1 operations per pixel for the segmentation.

The proposed layered motion estimator was simulated, including usage of the resulting displacement vector for picture rate conversion of 25 Hz film to 50 Hz display.

The vector field resulting from the motion estimator proved to be highly consistent and well suited for scan rate conversion. The quality obtained is considered attractive and, for most scenes, comparable with the quality achieved with MELZONIC (SAA4991).

The proposed Motion Estimation algorithm has no vector range limitation due to implementation, which is an advantage over MELZONIC (SAA4991).

A method of extending global motion estimation algorithms to the estimation of motion parameters in a layered video representation has been presented. A fixed number of parameter estimators is run in parallel, each calculating parameters for one image layer. A segmentation assigns each part of the image to the correct layer.

Although the estimators operate in parallel, some hierarchy exists. Each estimator, apart from the highest in the hierarchy, operates on image parts where higher ranked estimators in the hierarchy were unsuccessful in the previous image. Secondly, each estimator is prevented from pollution by parts of the image that will be better covered by estimators lower in the hierarchy.

Experiments indicate that the present result is not far from what was obtained with a dedicated design: Natural Motion with the MELZONIC (SAA4991). The algorithm, however, is much more suitable for implementation in software on a processor like the TriMedia.

Finally, the algorithms in accordance with the present invention may be interesting for other application areas of motion estimation, such as video compression and coding, video annotation and indexing, object tracking and noise reduction.

A first aspect of the invention can be summarized as follows. A new method for global motion-compensated up-conversion is described, and ways are indicated to extend the proposal to application in a layered video representation. Essentially, parameters describing the global motion are estimated, preferably using a recursive approach. The local motion vectors generated with these parameters are used to generate a motion-compensated image. Simultaneously, a segmentation mask is calculated on a reduced size image, the output of which is used to switch between different parameter sets or interpolation methods. An attractive low-cost version is detailed, which is suitable for implementation on currently available fully programmable devices (Natural Motion on a TriMedia).

The following salient features of preferred embodiments are noteworthy. A method, and apparatus realizing this method, for motion compensating video data, comprising:

at least two means for calculating global motion parameters from the input video data, interpolation means for calculating output video data from one or more input fields, in dependence of the, at least two, sets of global motion parameters, in which one of the at least two means for calculating global motion parameters provides parameters indicating a zero velocity for the entire image, regardless of the image content.

Preferably, the interpolation means is an order statistical filter, e.g., a three-tap median filter, which produces an output pixel from either:

the corresponding pixel in the previous field, the corresponding pixel in the next field, and the motion-compensated average from both neighboring fields (first option), or:

the motion-compensated pixel from the previous field, the motion-compensated pixel from the next field, and the non-motion-compensated average from both neighboring fields (second option).

Preferably, a segmentation signal activates the first decision, in case the local motion vector calculated from the second parameter set yields the best match on the reduced size input image.

Preferably, the segmentation signal is derived from a reduced size version of the input signal.

A method, and apparatus realizing this method, for motion-compensating video data, comprising:

at least two means for calculating global motion parameters from the input video data, interpolation means for calculating output video data from one or more input fields, in dependence of the, at least two, sets of global motion parameters, and a segmentation signal derived from a reduced size version of the input signal.

Preferably, one of the global motion parameter calculating means provides parameters indicating a zero velocity for the entire image, regardless of the image content.

A second aspect of the invention can be summarized as follows. A new method for global motion parameter estimation is described. Essentially, parameters, describing the global motion in the image are estimated using a recursive approach, i.e., an earlier n-dimensional (n is the number of parameters in the motion model) estimate is used as a prediction to which (n-dimensional) update vectors are added. The output parameter vector is the one resulting in the lowest match error. The extremely low complexity of the algorithm, and the high quality make it very attractive for future use in TV and Multi-Media applications, possibly running on fully programmable devices such as TriMedia.

The following salient features of a preferred embodiment are noteworthy. A method, and apparatus realizing this method, for estimating motion parameters (the parameter vector) of an image sequence, comprising:

means for furnishing a prediction parameter vector, i.e., a previously calculated motion parameter estimate, means for selecting at least one update parameter vector from an update set, means for adding said prediction vector to said at least one update vector, means for calculating the quality (cost function) of the resulting, at least two, parameter vectors, using data from at least two fields, means for selecting the best from the aforementioned, at least two, parameter vectors on the basis of their quality, means for outputting the selected parameter vector as the motion parameter estimate.

Preferably, penalties, temporal filtering, and temporal and/or spatial prediction are applied.

A third aspect of the present invention can be summarized as follows. A method of estimating motion parameters from video data is disclosed. The invention allows temporal predictive motion estimation on video data that, due to simple picture rate conversion techniques (repetition of the most recent picture), exhibits an irregular motion. The solution consists of using multiple temporal prediction vectors taken from various previous image pairs. This solution is economically justifiable, particularly in object-based motion estimators, where the number of motion vectors to be stored is very small. A software version of the algorithm has been shown to run real-time on the Philips TM1000 (TriMedia) processor.

The following salient features of a preferred embodiment are noteworthy. A method, and apparatus realizing this method, of estimating motion parameter vectors from video data, which furnishes, for at least some image-parts, at least two (temporal) prediction vectors estimated from data of different previous image pairs. Preferably, the above-mentioned at least two prediction vectors are candidates in a vector selection process determining the output vector for an image (part). Advantageously, in accordance with a criterion function, the best of the above-mentioned at least two prediction vectors is used as a basis for calculating candidate vectors (e.g., updating process) that are input of a vector selection process determining the output vector for an image (part). Preferably, the decision information (which of the at least two prediction vectors is best, in accordance with a criterion function) over a number of successive images (image parts), is used to detect picture repetition patterns (e.g., 3-2 pull-down and 2-2 pull-down of movie material, but also other patterns due to source-destination picture frequency mismatches).

A fourth aspect of the invention relates to a joint motion estimation and segmentation of video data, and can be summarized as follows. A method of segmenting an image into a fixed number of layers and estimate motion parameters for individual layers is disclosed. The invention provides a solution to the chicken and egg problem of combined motion estimation and segmentation. The solution consists of a weighting process that limits the pollution of the optimization criterion of a parameter estimator for a given layer by information dealt with by the other parameter estimators running in parallel. The extremely low complexity of the algorithm, and the high quality make it very attractive for future use in TV and Multi-Media applications. A software version of the algorithm has been shown to run real-time on the Philips TM1000 (TriMedia) processor.

In a preferred embodiment, a layered motion estimation algorithm is proposed that permits quasi-simultaneous motion estimation/segmentation up to a fixed maximum number of layers. The estimation results in one motion parameter set per layer, and a segmentation map that assigns these sets to different parts of the image (motion layers). Motion in a layer is modelled with a maximum of four parameters capable of describing pan, tilt and zoom. The concept shows some hierarchy, i.e., a ranking of the motion layers. In this way, the motion parameter estimation concerning one layer excludes parts of the image that have been described by a layer ranked higher in the hierarchy and is not polluted by parts of the image that are better described by layers ranked lower in the hierarchy. The concept results in a very low operations count. It has been shown to perform well, even in critical scan rate conversion applications, particularly in picture rate up-conversion. A variant including three layers has been scheduled to run in real-time on a Philips TriMedia processor.

The following salient features of preferred embodiments are noteworthy. A method, and apparatus realizing this method, for segmenting an image into a ranked set of layers and estimating motion parameters for every layer, comprising:

a parameter estimation (PE) process for every layer in the current image optimizing a criterion function based upon (groups of) pixels from at least two pictures, a segmentation process (SP) assigning motion parameter sets to image parts, a weighting process (WP) to define the individual effect of information from different image parts on the criterion function of a motion parameter estimator in which the WP reduces or eliminates the effect of information from those image parts that fulfil a first criterion, and increases the effect of information from those image parts that fulfil a second criterion.

Preferably, the first criterion is met if, in a previous iteration of the algorithm on the same or another picture pair, the image parts fell in regions which were adequately described by any of the motion parameter sets estimated by PEs active on layers with a higher rank number. "Adequately" means that an error function, using the parameter sets of the PEs active on layers higher in the hierarchy, stays below a threshold (either fixed, or adapted, e.g., to the average error).

Preferably, the second criterion is met if, in a previous iteration of the algorithm on the same or another picture pair, the image parts fell in regions which were best described by the motion parameter sets estimated by this given PE. "Best" means that an error function, using the parameter sets of the given PE, is lower than that of any of the other PEs.

Preferably, this error function is based upon the motion-compensated difference between the pixels in the current field and the corresponding pixels in the previous field, using the parameter sets to be evaluated (direct method).

Preferably, this error function is based upon the difference between motion vectors calculated with some method, and motion vectors resulting from the motion parameter set to be evaluated (indirect method).

Preferably, picture parts meeting the first criterion are eliminated in the error function of a given PE, and this first criterion is adapted in such a way that the picture area on which the criterion function is calculated remains within a given range (control loop to efficiently use maximum available processing power).

Preferably, the PE and/or the SP, and/or the WP operates on down-scaled and/or subsampled video data.

A method, and apparatus realizing this method, for segmenting an image into a ranked set of layers and estimating motion parameters for each layer, comprising:

an iterative parameter estimation process for every layer in the current image optimizing a criterion function based upon selected (groups of) pixels from at least two pictures, a segmentation process assigning to every part of the image one of the motion parameter sets, a selection process to define upon which (groups of) pixels from the at least two pictures the motion parameter estimator(s) should optimize their criterion function, in which the parameter estimation process iterates on its data more often than the other processes.

Preferably, the selection process selects for a given layer those (groups of) pixels, for which the parameter sets of layers higher in the hierarchy, in a previous picture did not give satisfactory results according to a rule. Preferably, this rule involves the comparison of an error(sum) of (groups of) pixels with a fixed or adaptive threshold.

Preferably, this threshold is adapted in such a way that the number of pixels on which the criterion function is calculated remains within a given range.

Preferably, the criterion function is a summed error calculated between selected (groups of) pixels from the previous picture and corresponding pixels from the current picture compensated for motion in accordance with the candidate motion parameters.

Preferably, the contribution of the selected pixels to the criterion function is weighted, depending on which layer they were assigned to (in the previous picture).

Preferably, the contribution of the selected pixels to the criterion function is increased if they were assigned to the same layer previously.

A method, and apparatus realizing this method, for segmenting an image into a ranked set of layers and estimating motion parameters for every layer, comprising:

a parameter estimation (PE) process for every layer in the current image optimizing a criterion function based upon (groups of) pixels from at least two pictures a segmentation process (SP) assigning to every part of the image one of the motion parameter sets, a selection process to define upon which (groups of) pixels from the at least two pictures the motion parameter estimator(s) should optimize their criterion function, in which the selection process allows a small fraction of the pixels only to contribute to the criterion function optimized by the PEs, regardless of the size of the layer to which these parameters are assigned by the segmentation process.

Although originally designed to run as an application on the Philips TriMedia processor, more applications are possible. Particularly, the concept can be designed into next generation VGA-controllers. Since this is dedicated silicon, the total cost is negligible. Such a VGA-controller may have an improved performance as compared with the TriMedia solution, because much more processing power is available in dedicated silicon. Furthermore, it is expected that, if more than two parallel parameter estimators are applied, the performance can be brought to a level which is potentially better than that of the current high-end solutions at a possibly lower cost.

It should be noted that the above-mentioned embodiments illustrate rather than limit the invention, and that those skilled in the art will be able to design many alternative embodiments without departing from the scope of the appended claims. The invention can be implemented by means of hardware comprising several distinct elements, and by means of a suitably programmed computer. In the device claim enumerating several means, several of these means can be embodied by one and the same item of hardware.

References

[1] U.S. Pat. No. 5,543,946 (Attorneys' docket PHN 14,066)

[2] A.M. Tekalp, "Digital Video Processing", Prentice Hall Signal Processing Series, ISBN 0-13190075-7, pp. 200–203.

[3] G. de Haan, P. W. A. C. Biezen, H. Huijgen and O. A. Ojo, "True Motion Estimation with 3-D Recursive Search Block-Matching", IEEE Transactions on Circuits and Systems for Video Technology, Vol.3, October 1993, pp. 368–388.

[4] G. de Haan, P. W. A. C Biezen, H. Huijgen, and O. A. Ojo, "Graceful Degradation in Motion Compensated Field-Rate Conversion", in: Signal Processing of HDTV, V, L. Stenger, L. Chiariglione and M. Akgun (Eds.), Elsevier 1994, pp. 249–256.

[5] PCT/IB97/00548 (Attorneys' docket PHN 16,112)

[6] G. de Haan, J. Kettenis, and B. Deloore, 'IC for Motion Compensated 100 Hz TV, with a Smooth Motion Movie-Mode', International Conference on Consumer Electronics, ICCE 95, June 1995, Chicago.

[7] G. de Haan, P. W. A. C Biezen, "Sub-pixel motion estimation with 3-D recursive search block-matching", Signal Processing: Image Communication 6 (1994), pp. 229–239.

[8] PCT/IB97/00884 (Attorneys' docket PHN 15,943)

[9] U.S. Pat. No. 5,495,300 (Attorneys' docket PHN 14,079)

[10] G. Thomas, "Television motion measurement for DATV and other applications," BBC Research Report, no. BBC RD 1987/11, 1987.

[11] R. Thoma and M. Bierling, "Motion compensating interpolation considering covered and uncovered background," Signal Processing: Image Communications 1, pp. 191–212, 1989.

[12] F. Wang, D. Anastassiou, and A. Netravali, "Time-recursive deinterlacing for IDTV and pyramid coding," Signal Processing: Image Communications 2, pp. 365–374, 1990.

[13] Kwon, Seo, Kim, and Kim, "A motion adaptive deinterlacing method," IEEE Transactions on Consumer Electronics, vol. 38, pp. 145–150, August 1992.

[14] G. de Haan and H. Huijgen, "New algorithm for motion estimation," in Chiariglione [38], pp. 109–116.

[15] G. de Haan and H. Huijgen, "Motion estimation for TV picture enhancement," in Signal Processing of HDTV III (H. Yasuda and L. Chiariglione, eds.), pp. 241–248, Elseviers Science Publishers B.V., 1992.

[16] T. Reuter, "A modified block-matching algorithm with vector reliability checking and adaptive smoothing," in Third International Conference on Image Processing and its Applications, (England), University of Warwick, July 1989.

[17] J. Konrad and E. Dubois, "A comparison of stochastic and deterministic solution methods in bayesian estimation of 2-d motion," Image and Vision Computing, vol. 8, pp. 304–317, November 1990.

[18] J. Jain and A. Jain, "Displacement measurement and its application in interframe image coding," IEEE Transactions on Communications, COM-29, no. 12, 1981.

[19] T. Koga, K. Iinuma, A. Hirano, Y. Iilima, and T. Ishiguro, "Motion-compensated interframe coding for video conferencing," in IEEE, Proceedings of the NTC 81, G5.3.1., (New Orleans La.), 1981.

[20] R. Srinivasan and K. Rao, "Predictive coding based on efficient motion estimation," IEEE Transactions on Communication, no. 8, pp. 888–896, 1985.

[21] H. Musmann, P. Pirsch, and J. Grallert, "Advances in picture coding," Proceedings of the IEEE, vol. 73, pp. 523–548, April 1985.

[22] A. Netravali and J. Robbins, "Motion compensated television coding," Bell Systems Technical Journal, no. 3, pp. 629–668, 1979.

[23] M. Ziegler, "Hierarchical motion estimation using the phase correlation method in 140 Mbit/s HDTV-coding," in Chiariglione [32], pp. 131–137.

[24] DE-C 40 23 449

[25] G. de Haan, J. Kettenis, and B. Deloore, "IC for motion compensated 100 Hz TV, with a smooth motion moviemode," IEEE Transactions on Consumer Electronics, vol. 42, pp. 165–174, May 1996.

[26] J. G. Choi and S. D. Kim, "Multi-stage segmentation of optical flow field," Signal Processing, vol. 54, pp. 109–118, 1996.

[27] D. Bagni, R. Lancini, P. Vicari, and S. Tubaro, "Motion estimation method using region-based segmentation methods," in Proc. International Workshop on HDTV '96, (Los Angeles), p. Sess. A2, October 1996.

[28] D. LeQuang, Z. Zaccarin, and S. Caron, "Object-oriented coding using successive motion field segmentation and estimation," in Proc. International Conference on Image Processing (ICIP'95), (Washington D.C.), pp. 207–210, October 1995.

[29] J. Y. A. Wang and E. H. Adelson, "Layered representation for motion analysis," in Proceedings of the IEEE Computer Vision and Pattern Recognition Conference, pp. 361–366, 1993.

[30] P. Csillag and L. Boroczky, "Frame rate conversion based on acceleration and motion-based segmentation," in SPIE, vol. 2952, pp. 438–448, 1996.

[31] F. Dufaux and F. Moscheni, "Motion estimation techniques for digital tv: a review and a new contribution," in Proceeding of the IEEE, vol. 83 n.6, pp. 858–876, 1995.

[32] S. Jeannin, "On the combination of a polynomial motion estimation with a hierarchical segmentation based video coding scheme," in Proc. International Conference on Image Processing (ICIP'96), (Lausanne, Switzerland), pp. 489–492, September 1996.

[33] K. E. Matthews and N. M. Namazi, "Simultaneous motion parameter estimation and image segmentation using the EM algorithm," in Proc. International Conference on Image Processing (ICIP'95), (Washington D.C.), pp. 542–545, October 1995.

[34] T. Darrel and D. Fleet, "Second-order method for occlusion relationships in motion layers," Tech. Rep. 314, MIT Media Laboratory Vision and Modelling Group, 1995.

[35] H. S. Sawhney, S. Ayer, and M. Gorkani, "Model-based 2D-3D dominant motion estimation for mosaicing video representation." On the net, 1995. A shorter version appeared in the IEEE Intl. Conf. on Computer Vision, Cambridge, Mass., USA, June 1995.

[36] H. S. Sawhney and S. Ayer, "Layered representation of motion video using robust maximum-likelihood estimation of mixture models and MDL encoding." On the net, 1995. A shorter version appeared in the IEEE Intl. Conf. on Computer Vision, Cambridge, Mass., USA, June 1995.

[37] J. Y. A. Wang and E. H. Adelson, "Spatio-temporal segmentation of video data," in Proceedings of the SPIE: Image and Video Processing II, vol. 2182, (San Jose), pp. 361–366, Febuary 1994.

[38] L. Chiariglione, ed., Signal Processing of HDTV II, Elseviers Science Publishers B.V., 1990.

What is claimed is:

1. A method of estimating motion in video data, the method comprising the steps:

furnishing at least two motion parameter sets from input video data, one motion parameter set indicating a zero velocity for all image parts in an image, and each motion parameter set having corresponding local match errors for all image parts in an image, a motion parameter set being a set of parameters describing motion in an image, said motion parameter set being used to calculate motion vectors; and determining output motion data from said input video data in dependence on said at least two motion parameter sets, wherein the importance of each motion parameter set in calculating said output motion data depends on the motion parameter sets' local match errors, wherein said step of furnishing at least two motion parameter sets includes the steps:

furnishing at least one previously calculated motion parameter set as at least one first prediction parameter vector;

adding at least one update parameter vector to said at least one first prediction parameter vector to form further prediction parameter vectors; and selecting one of said first and further prediction parameter vectors.

2. The method as claimed in claim 1, wherein said step of furnishing at least one previously calculated motion parameter set includes the step:

furnishing motion parameter sets calculated for at least two previous fields.

3. A method of estimating motion in video data, the method comprising the steps:

furnishing at least two motion parameter sets from input video data, one motion parameter set indicating a zero velocity for all image parts in an image, and each motion parameter set having corresponding local match errors for all image parts in an image, a motion parameter set being a set of parameters describing motion in an image, said motion parameter set being used to calculate motion vectors; and determining output motion data from said input video data in dependence on said at least two motion parameter sets, wherein the importance of each motion parameter set in calculating said output motion data depends on the motion parameter sets' local match errors, wherein said step of furnishing at least two motion parameter sets includes the step:

determining, for each motion parameter set other than the zero velocity set, an adjusted motion parameter set in dependence on global match errors, said global match errors being calculated for image parts in accordance with weights assigned to the image parts.

4. The method as claimed in claim 3, wherein, for a given adjusted motion parameter set determination, said weights are increased for those image parts for which the given motion parameter set has the lowest local match error in comparison with the local match errors of other adjusted motion parameter set determinations.

5. The method as claimed in claim 3, wherein, for a given adjusted motion parameter set determination, said weights are decreased for those image parts for which the local match error of another adjusted motion parameter set determination falls below a given threshold.

6. A method of motion-compensating video data, the method comprising the steps:

furnishing at least two motion parameter sets from input video data, one motion parameter set indicating a zero velocity for all image parts in an image, and each motion parameter set having corresponding local match errors for all image parts in an image, a motion parameter set being a set of parameters describing motion in an image, said motion parameter set being used to calculate motion vectors; and interpolating output video data from said input video data in dependence on said at least two motion parameter sets, wherein the importance of each motion parameter set in calculating said output video data depends on the motion parameter sets' local match errors, wherein said step of furnishing at least two motion parameter sets includes the steps:

furnishing at least one previously calculated motion parameter set as at least one first prediction parameter vector;

adding at least one update parameter vector to said at least one first prediction parameter vector to form further prediction parameter vectors; and selecting one of said first and further prediction parameter vectors.

7. A method of motion-compensating video data, the method comprising the steps:

furnishing at least two motion parameter sets from input video data, one motion parameter set indicating a zero velocity for all image parts in an image, and each motion parameter set having corresponding local match errors for all image parts in an image, a motion parameter set being a set of parameters describing motion in an image, said motion parameter set being used to calculate motion vectors; and interpolating output video data from said input video data in dependence on said at least two motion parameter sets, wherein the importance of each motion parameter set in calculating said output video data depends on the motion parameter sets' local match errors, wherein said interpolating step supplies:

a median of a corresponding pixel in a previous field, a corresponding pixel in a next field, and a motion-compensated average from both said previous and next fields, if the match error of the motion vector used for calculating said motion-compensated average exceeds the match error of the zero motion vector, or a median of a motion-compensated pixel from the previous field, a motion-compensated pixel from the next field, and a non-motion-compensated average from both said previous and next fields, if the match error of the motion vector used for furnishing said motion-compensated pixels falls below the match error of the zero motion vector.

8. A device for estimating motion in video data, the device comprising:

means for furnishing at least two motion parameter sets from input video data, one motion parameter set indicating a zero velocity for all image parts in an image, and each motion parameter set having corresponding local match errors for all image parts in an image, a motion parameter set being a set of parameters describing motion in an image, said motion parameter set being used to calculate motion vectors; and means for determining output motion data from said input video data in dependence on said at least two motion parameter sets, wherein the importance of each motion parameter set in calculating said output motion data depends on the motion parameter sets' local match errors, wherein said means for furnishing at least two motion parameter sets includes:

means for furnishing at least one previously calculated motion parameter set as at least one first prediction parameter vector;

means for adding at least one update parameter vector to said at least one first prediction parameter vector to form further prediction parameter vectors; and means for selecting one of said first and further prediction parameter vectors.

9. A device for motion-compensating video data, the device comprising:

means for furnishing at least two motion parameter sets from input video data, one motion parameter set indicating a zero velocity for all image parts in an image, and each motion parameter set having corresponding local match errors for all image parts in an image, a motion parameter set being a set of parameters describing motion in an image, said motion parameter set being used to calculate motion vectors; and means for interpolating output video data from said input video data in dependence on said at least two motion parameter sets, wherein the importance of each motion parameter set in calculating said output video data depends on the motion parameter sets' local match errors, wherein said interpolating means supplies:

a median of a corresponding pixel in a previous field, a corresponding pixel in a next field, and a motion-compensated average from both said previous and next fields, if the match error of the motion vector used for calculating said motion-compensated average exceeds the match error of the zero motion vector, or a median of a motion-compensated pixel from the previous field, a motion-compensated pixel from the next field, and a non-motion-compensated average from both said previous and next fields, if the match error of the motion vector used for furnishing said motion-compensated pixels falls below the match error of the zero motion vector.

10. Video display apparatus, comprising:

a device for motion-compensating video data as claimed in claim 9; and a display unit for displaying said input video data and said output video data.

11. A method of motion-compensating video data, the method comprising the steps:

furnishing at least two motion parameter sets from input video data, one motion parameter set indicating a zero velocity for all image parts in an image, and each motion parameter set having corresponding local match errors for all image parts in an image, a motion parameter set being a set of parameters describing motion in an image, said motion parameter set being used to calculate motion vectors; and interpolating output video data from said input video data in dependence on said at least two motion parameter sets, wherein the importance of each motion parameter set in calculating said output video data depends on the motion parameter sets' local match errors, wherein said step of furnishing at least two motion parameter sets includes the step:

determining, for each motion parameter set other than the zero velocity set, an adjusted motion parameter set in dependence on global match errors, said global match errors being calculated for image parts in accordance with weights assigned to the image parts.

12. A device for estimating motion in video data, the device comprising:

means for furnishing at least two motion parameter sets from input video data, one motion parameter set indicating a zero velocity for all image parts in an image, and each motion parameter set having corresponding local match errors for all image parts in an image, a motion parameter set being a set of parameters describing motion in an image, said motion parameter set being used to calculate motion vectors; and means for determining output motion data from said input video data in dependence on said at least two motion parameter sets, wherein the importance of each motion parameter set in calculating said output motion data depends on the motion parameter sets' local match errors, wherein said means for furnishing at least two motion parameter sets comprises:

means for determining, for each motion parameter set other than the zero velocity set, an adjusted motion parameter set in dependence on global match errors, said global match errors being calculated for image parts in accordance with weights assigned to the image parts.

13. A device for motion-compensating video data, the device comprising:

means for furnishing at least two motion parameter sets from input video data, one motion parameter set indicating a zero velocity for all image parts in an image, and each motion parameter set having corresponding local match errors for all image parts in an image, a motion parameter set being a set of parameters describing motion in an image, said motion parameter set being used to calculate motion vectors; and means for interpolating output video data from said input video data in dependence on said at least two motion parameter sets, wherein the importance of each motion parameter set in calculating said output video data depends on the motion parameter sets' local match errors, wherein said means for furnishing at least two motion parameter sets comprises:

means for determining, for each motion parameter set other than the zero velocity set, an adjusted motion parameter set in dependence on global match errors, said global match errors being calculated for image parts in accordance with weights assigned to the image parts.

14. Video display apparatus, comprising:

a device for motion-compensating video data as claimed in claim 13; and a display unit for displaying said input video data and said output video data.

15. A device for motion-compensating video data, the device comprising:

means for furnishing at least two motion parameter sets from input video data, one motion parameter set indicating a zero velocity for all image parts in an image, and each motion parameter set having corresponding local match errors for all image parts in an image, a motion parameter set being a set of parameters describing motion in an image, said motion parameter set being used to calculate motion vectors; and means for interpolating output video data from said input video data in dependence on said at least two motion parameter sets, wherein the importance of each motion parameter set in calculating said output video data depends on the motion parameter sets' local match errors, wherein said means for furnishing at least two motion parameter sets comprises:

means for furnishing at least one previously calculated motion parameter set as at least one first prediction parameter vector;

means for adding at least one update parameter vector to said at least one first prediction parameter vector to form further prediction parameter vectors; and means for selecting one of said first and further prediction parameter vectors.

16. Video display apparatus, comprising:

a device for motion-compensating video data as claimed in claim 15; and a display unit for displaying said input video data and said output video data.

* * * * *